US011413690B2

(12) United States Patent
Yoshioka

(10) Patent No.: US 11,413,690 B2
(45) Date of Patent: Aug. 16, 2022

(54) SMALL-DIAMETER DRILL BIT

(71) Applicant: Mitsubishi Hitachi Tool Engineering, Ltd., Tokyo (JP)

(72) Inventor: Shogo Yoshioka, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 649 days.

(21) Appl. No.: 16/090,675

(22) PCT Filed: Apr. 14, 2017

(86) PCT No.: PCT/JP2017/015260
§ 371 (c)(1),
(2) Date: Oct. 2, 2018

(87) PCT Pub. No.: WO2017/179689
PCT Pub. Date: Oct. 19, 2017

(65) Prior Publication Data
US 2020/0324348 A1    Oct. 15, 2020

(30) Foreign Application Priority Data
Apr. 15, 2016 (JP) .............................. JP2016-082007

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/14* (2013.01);
(Continued)

(58) Field of Classification Search
CPC .......... B23B 2251/443; B23B 2251/14; B23B 2251/18; B23B 2251/426; B23B 51/20
See application file for complete search history.

(56) References Cited

U.S. PATENT DOCUMENTS 4,605,347 A * 8/1986 Jodock .................... B23B 51/02
408/224
4,983,079 A   1/1991 Imanaga et al.
(Continued)

FOREIGN PATENT DOCUMENTS

| CN | 101678475 A | 3/2010 |
|----|-------------|--------|
| CN | 102665982 A | 9/2012 |

(Continued)

OTHER PUBLICATIONS

Kennametal Master Catalog 2013, p. G2 (Year: 2013).*
(Continued)

*Primary Examiner* — Nicole N Ramos
(74) *Attorney, Agent, or Firm* — Locke Lord LLP

(57) ABSTRACT

In this small-diameter drill bit, two cutting blades having main cutting blades, of which a difference between lengths are 0.04 mm or less, are formed on a tip of a double-margin drill bit body having a diameter of 2 mm or less and a margin length/diameter ratio of 3 or more. Two tip flank faces are formed such that a first extension line extending from a linear first intersecting ridgeline between a first tip flank face and a second tip flank face of one of the flank faces to the linear first intersecting ridgeline of the other flank face is located on a side in the drill bit rotation direction with respect to the other linear first intersecting ridgeline. A distance between the first extension line and the linear first intersecting ridgeline is in a range of 0.04 mm-0.08 mm.

5 Claims, 2 Drawing Sheets

(52) U.S. Cl.
CPC ....... *B23B 2251/18* (2013.01); *B23B 2251/40* (2013.01); *B23B 2251/443* (2013.01)

(56) References Cited

U.S. PATENT DOCUMENTS

| | | | | |
|---|---|---|---|---|
| 6,132,149 | A * | 10/2000 | Howarth | B23B 51/02 |
| | | | | 408/229 |
| 7,306,411 | B2 * | 12/2007 | Mabuchi | B23B 51/02 |
| | | | | 408/144 |
| 7,422,396 | B2 * | 9/2008 | Takikawa | B23B 51/0018 |
| | | | | 408/1 R |
| 11,090,738 | B2 * | 8/2021 | Yoshioka | B23B 51/02 |
| 2004/0101379 | A1 * | 5/2004 | Mabuchi | B24B 19/04 |
| | | | | 408/230 |
| 2007/0160437 | A1 * | 7/2007 | Shultz | B23B 51/02 |
| | | | | 408/230 |
| 2007/0253787 | A1 * | 11/2007 | Ishii | B23B 27/141 |
| | | | | 407/113 |
| 2008/0056835 | A1 * | 3/2008 | Astrand | B23B 51/02 |
| | | | | 408/144 |
| 2008/0089753 | A1 * | 4/2008 | Takikawa | B23B 51/02 |
| | | | | 408/230 |
| 2012/0201619 | A1 * | 8/2012 | Olsson | B24B 3/32 |
| | | | | 408/230 |
| 2015/0283625 | A1 * | 10/2015 | Sato | B23B 51/02 |
| | | | | 408/230 |

FOREIGN PATENT DOCUMENTS

| | | | | |
|---|---|---|---|---|
| CN | 103459073 | A | 12/2013 | |
| CN | 103906592 | A | 7/2014 | |
| CN | 104755211 | A | 7/2015 | |
| EP | 1396303 | A2 | 3/2004 | |
| JP | 02-124208 | A | 5/1990 | |
| JP | 04-502884 | A | 5/1992 | |
| JP | 2005-305610 | A | 11/2005 | |
| JP | 2008-093805 | A | 4/2008 | |
| JP | 4350161 | B | 10/2009 | |
| JP | 2010-274409 | A | 12/2010 | |
| KR | 100643677 | B1 * | 11/2006 | ............ B23B 51/02 |
| WO | 89/08520 | A1 | 9/1989 | |
| WO | 2007/083967 | A1 | 7/2007 | |
| WO | WO-2014069179 | A1 * | 5/2014 | ............ B23B 51/02 |

OTHER PUBLICATIONS

International Search Report dated Jun. 27, 2017, issued for PCT/JP2017/015260 and English translation thereof.
Supplementary European Search Report dated Nov. 15, 2019, issued for the European Patent Application No. 17782502.3.
Office Action dated Aug. 14, 2019, issued for Chinese Patent Application No. 201780021010.5 and a partial English translation of Search Report.

* cited by examiner

SMALL-DIAMETER DRILL BIT

TECHNICAL FIELD

The present invention relates to an elongated double-margin small-diameter drill bit in which cutting blades are formed at a cutting blade part of a tip of a drill bit body that rotates around an axis, first and second margin parts are formed on a land part of an outer periphery of a cutting blade part, the diameter of the cutting blades is 2 mm or less, and the ratio of a margin length and the diameter of each cutting blade is 3 or more.

BACKGROUND ART

Patent Document 1 discloses a double-margin drill bit having first and second margin parts on two lands, respectively. In this drill bit, a second margin part adjacent to a side of a chip discharge groove in a drill bit rotation direction includes an outer peripheral end located on a land part at an intersecting ridgeline between a tip flank face and a thinning part, and is disposed so as to be separated by a predetermined distance from a heel part to the side in the drill bit rotation direction.

CITATION LIST

Patent Literature

[Patent Document 1] Japanese Unexamined Patent Application, First Publication No. 2005-305610

SUMMARY OF INVENTION

Technical Problem

In an elongated drill bit in which diameter D of each cutting blade is a small diameter and a ratio L/D of a margin length L in an axis direction from an outer peripheral end of the cutting blade to a rear end of a margin part and the diameter D is large, shaking resulting from cutting resistance in a cutting blade part that is formed with the cutting blades and is cut into a workpiece is likely to occur. Additionally, in cutting machining using such a drill bit, particularly in a case where a through-hole is formed in the workpiece, there is a concern that the cutting blade part shakes greatly during drilling of the hole and hole accuracy is impaired.

In this respect, in the double-bladed double-margin drill bit as disclosed in Patent Document 1, a total of four margin parts come into sliding contact with an inner peripheral surface of a machined hole. Therefore, the shaking of the cutting blade part can be suppressed to some extent. However, if an elongated small-diameter drill bit in which the diameter D of each cutting blade is 2 mm or less and the ratio L/D becomes 3 or more is used, the rigidity of the cutting blade part becomes small, and a decrease in hole accuracy resulting from the shaking of the cutting blade part becomes remarkable. As a result, there is a concern that the cutting blade part may break during drilling.

The invention has been made under such a background, and an object thereof is to provides a small-diameter drill bit capable of preventing a decrease in hole accuracy and also capable of preventing breakage of a cutting blade part, even in the elongated small-diameter drill bit as described above.

Advantageous Effects of Invention

In order to solve the above problems to achieve such an object, the invention provides a small-diameter drill bit in which two chip discharge grooves opening to tip flank faces of a drill bit body and extending to a rear end side are formed symmetrically with respect to an axis at an outer periphery of a tip part of the drill bit body that is configured to rotate around the axis, cutting blades are respectively formed at intersecting ridgeline parts between wall faces of the chip discharge grooves that face a drill bit rotation direction and the tip flank faces, a first margin part adjacent to a side of each of the chip discharge grooves opposite to the drill bit rotation direction, and a second margin part adjacent to a side of the chip discharge groove in a drill bit rotation direction are formed on a land part between the chip discharge grooves, and a diameter D of the cutting blades is 2 mm or less. A ratio L/D of a margin length L in a direction of the axis from an outer peripheral end of each of the cutting blades to a rear end of each of the first and second margin parts, and the diameter D is 3 or more. A thinning part is formed at an inner periphery a tip part of the chip discharge groove. The thinning part has a thinning face that faces the side opposite to the drill bit rotation direction. The cutting blade includes has a main cutting blade that linearly extends from an outer periphery of the drill bit body toward an inner periphery side thereof as seen from a tip side in the axis direction, and a thinning blade that is bent on the inner peripheral side of the main cutting blade and is formed at an intersecting ridgeline part between the thinning part and each of the tip flank face. The difference between lengths of the two main cutting blades as seen from the axis direction tip side is 0.04 mm or less. The tip flank face has a first tip flank face and a second tip flank face. The first tip flank face is connected to a side of the cutting blade opposite to the drill bit rotation direction. The second tip flank face is connected to a farther side of the first tip flank face opposite to the drill bit rotation direction, intersects the thinning face, and has a flank angle larger than the first tip flank face. A first intersecting ridgeline between the first tip flank face and the second tip flank face and a second intersecting ridgeline between the second tip flank face and the thinning face are linear as seen from the axis direction tip side. As seen from the axis direction tip side, the two tip flank faces are formed such that a first extension line extending from the first intersecting ridgeline in one of the tip flank faces to the other tip flank face side is located on a side in the drill bit rotation direction side with respect to the first intersecting ridgeline of the other tip flank face. The distance between the first extension line and the first intersecting ridgeline as seen from the axis direction tip side is in a range of 0.04 mm to 0.08 mm. As seen from the axis direction tip side, the two tip flank faces are formed such that a second extension line extending from the second intersecting ridgeline in the one tip flank face to the other tip flank face side is located in a straight line with the second intersecting ridgeline of the other tip flank face or located on the side in the drill bit rotation direction with respect to the second intersecting ridgeline of the other tip flank face. The distance between the second extension line and the second intersecting ridgeline is in a range of 0.08 mm or less as seen from the axis direction tip side.

Since such a small-diameter drill bit is a double-margin drill bit in which the first and second margin part are formed in each of two land parts, the cutting blade part can be supported by an inner peripheral surface of a machined hole by a total of four margin parts, and even during through-hole drilling, shaking of the cutting blade part can be prevented. In addition, since the difference between the lengths of the two main cutting blades that form a linear shape as seen from the axis direction tip side in the two cutting blades is 0.04 mm or less, and the difference between cutting resistances acting on the two main cutting blades is also small, the shaking of the cutting blade part can be suppressed. That is, in a small-diameter drill bit having a cutting blade diameter is 2 mm or less, if the difference between the lengths of the main cutting blades is larger than 0.04 mm, there is a concern that the balance of a load in a radial direction with respect to the axis collapses due to the difference between the cutting resistances and shaking occurs in the cutting blade part.

The two tip flank faces are formed such that the first extension line from the one tip flank face is located on the side in the drill bit rotation direction with respect to the first intersecting ridgeline of the other tip flank face. That is, as the two first tip flank faces overlap each other in the direction orthogonal to the first intersecting ridgeline as seen from the axis direction tip side, the widths thereof are larger. Hence, the rigidity of the cutting blades can be secured by the first tip flank face having a small flank angle, and even in an elongated small-diameter drill bit, it is possible to sufficiently prevent a decrease in hole accuracy resulting the shaking against the cutting resistances.

Here, if the distance between the first extension line of one tip flank face and the first intersecting ridgeline of the other tip flank face as seen from the axis direction tip side is smaller than 0.04 mm, it is difficult to sufficiently secure the rigidity of the cutting blades in this way. Additionally, if this distance is larger than 0.08 mm, there is a concern that a portion, on the first intersecting ridgeline side, of the first tip flank face having a small flank angle comes into contact with the bottom of the machined hole to increase resistance and promote wear.

Moreover, the two tip flank faces are formed such that the second extension line from the one tip flank face is located in a straight line with the second intersecting ridgeline of the other tip flank face and located on the side in the drill bit rotation direction in a distance range of 0.08 mm or less with respect to the second intersecting ridgeline. The two second tip flank faces are formed such that at least the second intersecting ridgelines overlap each other in the direction orthogonal to the second intersecting ridgelines as seen from the axis direction tip side. Hence, the rigidity of the cutting blades can also be secured by the second tip flank faces having a large flank angle. However, if this distance is larger than 0.08 mm, there is a concern that an increase of resistance and promotion of wear are caused due to the contact of the second tip flank faces with the bottom of the hole.

Additionally, by smoothing the surface of the chip discharge groove such that the arithmetic mean curvature Spc (1/mm) of the peak apexes defined by ISO25178 is 800 or less clogging of chips is suppressed, and wear and sudden breakage of the rake faces can be markedly reduced.

Moreover, by forming the second margin part from the tip flank face to the thinning face in the circumferential direction, the second margin part comes into sliding contact with the inner peripheral surface of the machined hole early. As a result, shaking of the drill bit body during machining can be suppressed.

Advantageous Effects of Invention

As described above, according to the invention, even in the elongated small-diameter drill bit, not only the cutting blade part can be supported with the double margin, but also the difference between the cutting resistances that act on the two main cutting blades can be made small, the rigidity of the cutting blades can be sufficiently secured to suppress the shaking of the cutting blade part, and hole drilling with little breakage can be performed with high accuracy.

DESCRIPTION OF EMBODIMENTS

Figure 1:
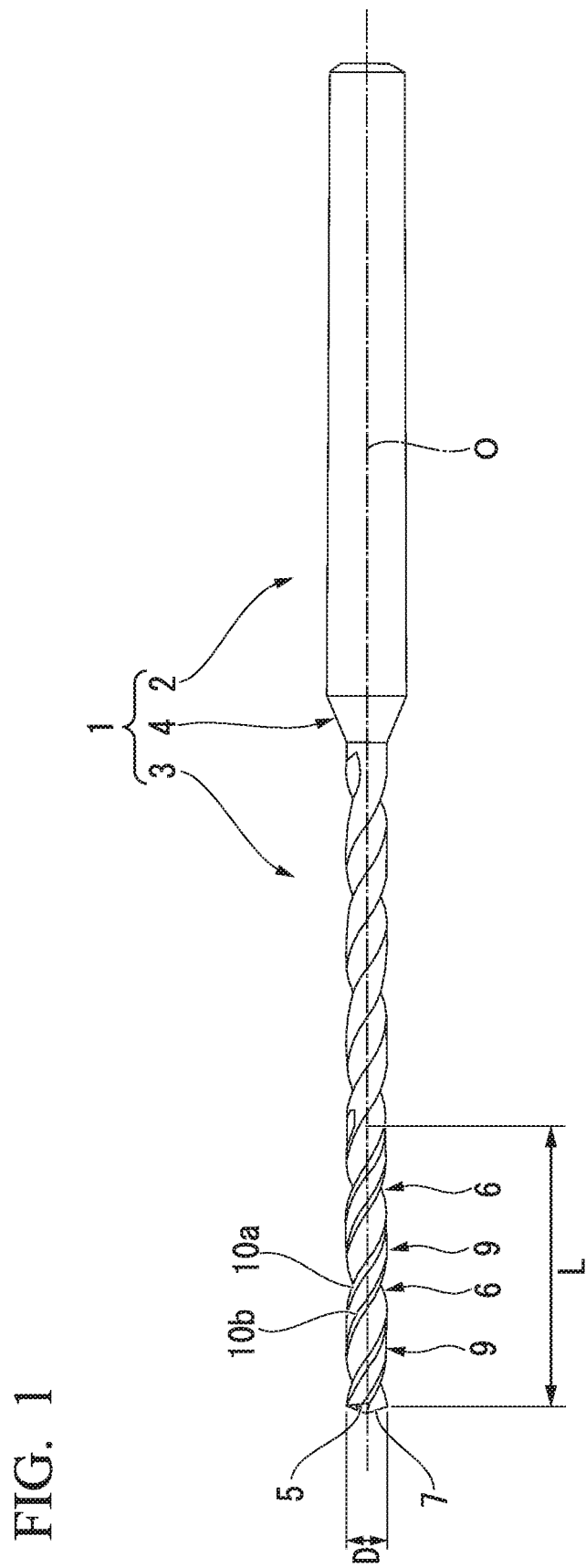
FIG. 1 is a side view showing an embodiment of the invention.
Figure 2:
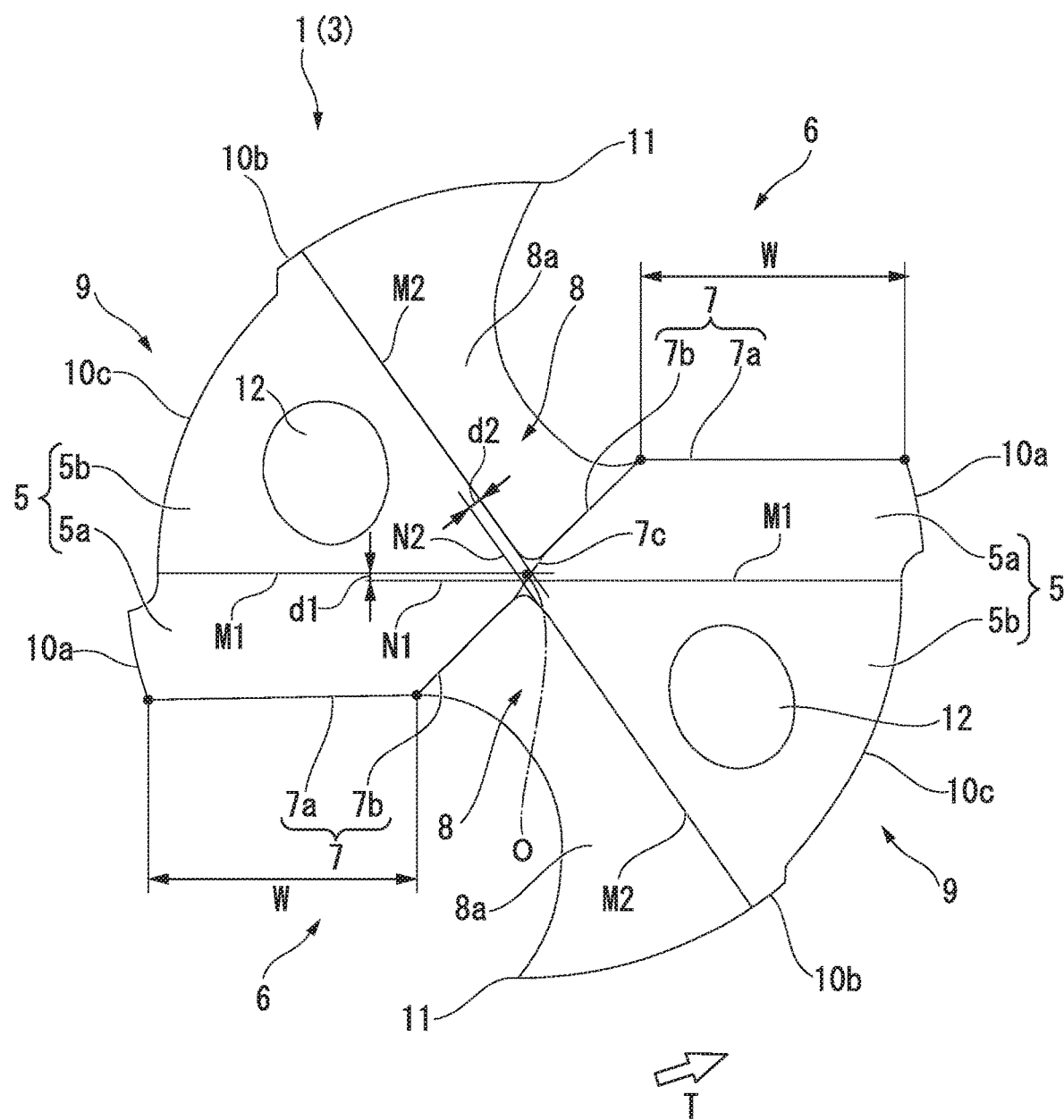
FIG. 2 is an enlarged front view of the embodiment shown in FIG. 1 as seen from an axis direction tip side.

FIGS. 1 and 2 show an embodiment of the invention. In the present embodiment, a drill bit body 1 is integrally formed in a multi-stage, substantially columnar shape centered on an axis O, using hard materials, such as cemented carbide. A portion on a rear end side (a right side in FIG. 1) of the drill bit body 1 serves as a columnar shank part 2. A portion on a tip side (a left side in FIG. 1) of the drill bit body 1 serves as a cutting blade part 3 having a diameter smaller than the shank part 2 and having a substantially columnar outer shape. A portion between the shank part 2 and the cutting blade part 3 serves as a tapered neck part 4 having a truncated cone shape that gradually decreases in diameter toward the tip side.

In such a small-diameter drill bit, the shank part 2 is gripped by a main shaft of a machine tool and is fed to the tip side in the direction of the axis O while being rotated in the drill bit rotation direction T around the axis O, and thereby, drilling is performed in a workpiece made of metal, such as stainless steel or carbon steel such that a through-hole is formed by the cutting blade part 3.

Tip flank faces 5 of a tip of the cutting blade part 3 open to an outer peripheral part of the cutting blade part 3, and two chip discharge grooves 6, which are twisted toward a side opposite to the drill bit rotation direction T as approaching the rear end side in the direction of the axis O, are formed symmetrically with respect to the axis O. Intersecting ridgeline parts between wall faces of the chip discharge grooves 6, which face the drill bit rotation direction T, and the tip flank faces 5 are formed with cutting blades 7 having the wall faces as rake faces. Additionally, thinning parts 8 are formed at tip part inner peripheries of the chip discharge grooves 6 so as to be cut away from inner peripheral parts of the wall faces of the chip discharge grooves 6 that face the drill bit rotation direction T to outer peripheries of the wall faces that faces the side opposite to the drill bit rotation direction T.

As shown in FIG. 2, each cutting blade 7 includes a main cutting blade 7a and a thinning blade 7b. The main cutting blade 7a linearly extends from an outer periphery of the cutting blade part 3 of the drill bit body 1 toward an inner periphery side thereof as seen from the tip side in the direction of the axis O. Each thinning blade 7b is bent at an obtuse angle with respect to the main cutting blade 7a at an inner periphery of the main cutting blade 7a as seen from the tip side in the direction of the axis O, and extends toward the axis O. The thinning blade 7b is formed at an intersecting ridgeline part between a wall face of the thinning part 8, which faces the drill bit rotation direction T, and each tip flank face 5. A diameter D of the cutting blade 7, that is, the diameter of a circle that is formed on a rotation track around the axis O by an outer peripheral end of the cutting blade 7 is 2 mm or less, and is 1 mm in the present embodiment.

The difference between lengths W of two linear main cutting blades 7a as seen from the tip side in the direction of the axis O, that is, the difference between lengths from outer peripheral ends of two cutting blades 7 (outer peripheral ends of two main cutting blades 7a) as seen from the tip side in the direction of the axis O to intersection points between the main cutting blades 7a and the thinning blades 7b is 0.04 mm or less. In addition, the lengths W of the main cutting blades 7a are longer than the lengths of the thinning blades 7b as seen from the tip side in the direction of the axis O. Moreover, the thinning blades 7b do not reach the axis O, and a chisel 7c orthogonal to the axis O is formed as an intersecting ridgeline between two tip flank faces 5 between thinning blades 7b of the two cutting blades 7.

Additionally, a first margin part 10a and a second margin part 10b are formed on an outer peripheral surface of a land part 9 that is a portion between two chip discharge grooves 6 in the outer peripheral part of the cutting blade part 3. The first margin part 10a is adjacent to the side of each chip discharge groove 6 opposite to the drill bit rotation direction T, that is, the cutting blade 7 side. The second margin part 10b is adjacent to the side of the chip discharge groove 6 in the drill bit rotation direction T, that is, a heel 11 side. Outer peripheral surfaces of the first and second margin parts 10a and 10b are formed so as to be located on a cylindrical surface, centered on the axis O, of a diameter equal to the diameter D of each cutting blade 7, that is, the diameter of the circle formed in the rotation track around the axis O by the outer peripheral end of the cutting blade 7. In the present embodiment, the first and second margin parts 10a and 10b are respectively formed at both circumferential ends on the outer peripheral surface of the land part 9.

Moreover, a ratio L/D of a margin length L in the direction of the axis O from the outer peripheral end of the cutting blade 7 to a rear end of the first and second margin part 10a or 10b to the diameter D is 3 or more and is about 7 in the present embodiment. Therefore, the small-diameter drill bit of the present embodiment is a double-bladed double-margin elongated small-diameter twist drill bit. In addition, in a case where the positions of the rear ends of the first and second margin parts 10a and 10b in the direction of the axis O are different from each other, the margin length L is a length up to the rear end of a shorter margin part.

Here, in the present embodiment, as shown in FIG. 1, the first and second margin parts 10a and 10b are formed up to a middle part of the cutting blade part 3, and the outer peripheral surface of the cutting blade part 3 on the rear end side with respect to this middle part is a cylindrical surface centered on the axis O of the diameter D. Additionally, although not shown, when the drill bit body is seen from a direction perpendicular to the direction of the axis O, the circumferential width of the first margin part 10a is larger than the circumferential width of the second margin part 10b in a range of less than about 0.6 times the diameter D from the tip side in the direction of the axis O. When the drill bit body is seen from the direction perpendicular to the direction of the axis O, the circumferential width of the first margin part 10a is approximately equal to the circumferential width of the second margin part 10b in a range of less than about 0.7 times the diameter D from the tip side in the direction of the axis O.

Moreover, a portion between the first and second margin parts 10a and 10b of the land part 9 serves as an outer peripheral relief face 10c located on the cylindrical surface, centered on the axis O, having a diameter slightly smaller than the above diameter D.

Meanwhile, the tip flank face 5 extends toward the rear end side of the drill bit body 1 as approaching the side opposite to the drill bit rotation direction T from the cutting blade 7, and is formed so as to extend toward the rear end side of the drill bit body 1 as approaching an outer peripheral side. Accordingly, a predetermined flank angle and a predetermined tip angle are given to the cutting blade 7. Moreover, the tip flank face 5 includes a first tip flank face 5a and a second tip flank face 5b. The first tip flank face 5a has a certain small flank angle connected to the side of the cutting blade 7 opposite to the drill bit rotation direction T. The second tip flank face 5b is connected to a farther side of the first tip flank face 5a opposite to the drill bit rotation direction T. The second tip flank face 5b has a certain larger flank angle than the first tip flank face 5a.

Additionally, a thinning face 8a, which is a wall face that faces the side of the thinning part 8 opposite to the drill bit rotation direction T, intersects the side of the second tip flank face 5b opposite to the drill bit rotation direction T. In addition, two coolant holes 12 are drilled symmetrically with respect to the axis O by the drill bit body 1 so as to be twisted in accordance with the twist of each chip discharge groove 6 from the rear end surface of the shank part 2. The coolant holes 12 open to the second tip flank faces 5b of the tip flank faces 5, respectively, through the land part 9 of the cutting blade part 3. During drilling, a coolant is supplied to the cutting blades 7 or a cutting region of the workpiece via the coolant holes 12.

Moreover, as seen from the tip side in the direction of the axis O, a first intersecting ridgeline M1 that is an intersecting ridgeline between the first and second tip flank faces 5a and 5b is formed in a straight line extending parallel to the main cutting blade 7a of each cutting blade 7. Additionally, a second intersecting ridgeline M2, which is an intersecting ridgeline between the second tip flank face 5b and the thinning face 8a, is also formed in a straight line extending in a direction intersecting the first intersecting ridgeline M1 at an acute angle as seen from the tip side in the direction of the axis O.

As seen from the tip side in the direction of the axis O, a first extension line N1, which is an extension line extending from the first intersecting ridgeline M1 in one tip flank face 5 to the other tip flank face 5 side is located on the side in the drill bit rotation direction T with respect to the first intersecting ridgeline M1 of the other tip flank face 5, between the two tip flank faces 5 connected to sides of the two cutting blades 7 opposite to the drill bit rotation direction T. Therefore, the first intersecting ridgeline M1 and the first extension line N1 of the two tip flank faces 5 are parallel to each other as seen from the tip side in the direction of the axis O. Moreover, a distance d1 between the first extension line N1 from the one tip flank face 5 and the first intersecting ridgeline M1 of the other tip flank face 5 is in a range of 0.04 mm to 0.08 mm.

Additionally, as seen from the tip side in the direction of the axis O, a second extension line N2, which is an extension line extending from the second intersecting ridgeline M2 in one tip flank face 5 to the other tip flank face 5 side, extends to form a straight line with the second intersecting ridgeline M2 of the other tip flank face 5 or extends in parallel so as to be located on the side in the drill bit rotation direction T with respect to the second intersecting ridgeline M2 of the other tip flank face 5, between the two tip flank faces 5 connected to sides of the two cutting blades 7 opposite to the drill bit rotation direction T. A distance d2 between the second extension line N2 from the one tip flank face 5 of and the second intersecting ridgeline M2 of the other tip flank face 5 is in a range of 0.08 mm or less, and a lower limit value is 0 mm in a case where the second extension line N2 and the second intersecting ridgeline M2 form a straight line.

The small-diameter drill bit configured in this way is a double-margin drill bit, the first and second margin parts 10a and 10b are respectively formed on outer peripheral surfaces of two land parts 9, and during hole drilling, a total of four first and second margin parts 10a and 10b can be brought into sliding contact with an inner peripheral surface of a machined hole formed by the cutting blades 7 to support the cutting blade part 3. For this reason, for example, even during drilling of the through-hole, the cutting blade part 3 can be supported in the four first and second margin parts 10a and 10b left in sliding contact with the machined hole to prevent shaking in a radial direction with respect to the axis O from occurring in the cutting blade part 3.

In addition, it is desirable that the second margin part 10b is formed in the circumferential direction from the second tip flank face 5b to the thinning face 8a. In this way, by forming the second margin part 10b from the side of the second tip flank face 5b in the drill bit rotation direction T to the thinning face 8a, the second margin part 10b comes into sliding contact with the inner peripheral surface of the machined hole early. As a result, shaking of the drill bit body 1 during machining can be suppressed. Therefore, the straightness of the drilled hole is excellent, and breakage of the drill bit body 1 resulting from hole bending can be suppressed.

Additionally, in the small-diameter drill bit having the above configuration, as seen from the tip side in the direction of the axis O, the difference between the lengths W of the two linear main cutting blades 7a that performs main cutting in the cutting blades 7 is 0.04 mm or less. In this respect, although the difference between the lengths W of the two main cutting blades 7a is ideally 0 mm, it is difficult to set the difference to 0 mm in practice. Hence, it is inevitable that a slight difference occurs. However, by setting the difference between the lengths W to an extremely small value of 0.04 mm or less, according to the drill bit having the above configuration, a difference between cutting resistances acting on the two main cutting blades 7a during drilling can be made small. As a result, a load to the cutting blade part 3 in the radial direction with respect to the axis O can be balanced. This can contribute to shaking suppression of the cutting blade part 3. Moreover, it is desirable that the difference between the lengths W of the main cutting blades 7a is 0.02 mm or less.

Moreover, as seen from the tip side in the direction of the axis 0, the first extension line N1 from the one tip flank face 5 is located on the side in the drill bit rotation direction T with respect to the first intersecting ridgeline M1 of the other tip flank face 5 between the two tip flank faces 5. As shown in FIG. 2, the two first tip flank faces 5a are widely formed so as to overlap each other beyond the axis 0 in a direction orthogonal to the first intersecting ridgeline M1. That is, by making wider the first tip flank face 5a having a small flank angle and a large blade angle, the rigidity of the cutting blade 7 with respect to the cutting resistance can be secured, and this also can suppress the shaking of the cutting blade part 3.

Moreover, as seen from the tip side in the direction of the axis O, the second extension line N2 from the one tip flank face 5 is located in a straight line with the second intersecting ridgeline M2 of the other tip flank face 5 or located on the side in the drill bit rotation direction T at an interval d2 in a range of 0.08 mm or less with respect to the second intersecting ridgeline M2, between the two tip flank faces 5. That is, also between the two second tip flank faces 5b, at least the second intersecting ridgelines M2 overlap each other in a direction orthogonal to the second intersecting ridgeline M2 or the second tip flank faces 5b themselves overlap each other in this direction. Accordingly, the rigidity of the cutting blades 7 can also be secured by the second tip flank faces 5b having a large flank angle.

For this reason, according to the small-diameter drill bit having the above configuration, even in an elongated small-diameter drill bit in which the diameter D of each cutting blade 7 is 2 mm or less and the ratio L/D of the diameter D to the margin length L is 3 or more, by virtue of the synergistic effects resulting from the above-described configuration, the shaking of the cutting blade part 3 can be reliably suppressed, and it is possible to improve hole accuracy and also to prevent breakage or the like of the cutting blade part 3. In addition, the lower limit value of the diameter D is desirably 0.5 mm and more desirably 1.0 mm. Additionally, the upper limit value of the ratio L/D is preferably 45, and the upper limit value of L/D is more preferably 30.

In addition, the discharge amount of the coolant depends on the internal diameter of each coolant hole 12. Hence, by increasing the internal diameter of the coolant hole 12, the discharge amount of the coolant increases and chip discharge performance is excellent. In order to enhance the chip discharge performance more in the small-diameter drill bit, the internal diameter (diameter) of the coolant holes 12 is desirably 0.1×D or more and more desirably 0.13×D or more with respect to the diameter D of the cutting blade 7. However, if the internal diameter of the coolant hole 12 becomes large too large, the rigidity of the cutting blade part 3 of the small-diameter drill bit decreases, and is likely to break. Hence, the internal diameter of the coolant hole 12 is desirably 0.2×D or less with respect to the diameter D of the cutting blade 7.

Here, if the difference between the lengths W of the two main cutting blades 7a as seen from the tip side in the direction of the axis O is larger than 0.04 mm, particularly, in an elongated small-diameter drill bit having the above configuration, there is a concern that a load to the cutting blade part 3 in the radial load with respect to the axis O cannot be balanced. Additionally, similarly, as seen from the tip side in the direction of the axis O, if the distance d1 between the first extension line N1 of the one tip flank face 5 and the first intersecting ridgeline M1 of the other tip flank face 5 is smaller than 0.04 mm, the rigidity of each cutting blade can be sufficiently secured as described above. Conversely, if the distance d1 is larger than 0.08 mm, there is a concern that the portion of the first tip flank face 5a having a small flank angle, particularly on the first intersecting ridgeline M1 side, comes into contact with the bottom of a machined hole to causes an increase in resistance, and wear of the tip flank face 5 is promoted.

Moreover, as seen from the tip side in the direction of the axis O, if the second extension line N2 from the tip flank face 5 is located on the side opposite to the drill bit rotation direction T of the second intersecting ridgeline M2 of the other tip flank face 5 (that is, if the distance d2 is less than 0 mm), there is a concern that it is insufficient to secure the rigidity of the cutting blade 7 resulting from the second tip flank face 5b as described above. Meanwhile, if the distance d2 is larger than 0.08 mm, in a small-diameter drill bit in which the diameter D of the cutting blade 7 is 2 mm or less, there is also a concern that the second tip flank face 5b comes into contact with the bottom of the machined hole to cause an increase in resistance or promotion of wear.

Moreover, in a small-diameter drill bit in which the cross-sectional area of the chip discharge groove 6 is inevitably restricted, it is possible to make the surface of the chip discharge groove 6 smooth, thereby suppressing chip clogging to markedly reduce wear or sudden breakage of the rake faces. Particularly, In order to suppress the sudden breakage of the elongated small-diameter drill bit, variations in tool performance are large only by smoothing arithmetic mean roughness Ra or maximum height roughness Rz that is surface roughness in general line evaluation, and it is important to control surface roughness in wider surface evaluation. In order to suppress the sudden breakage or the like of the small-diameter drill bit, it is effective to control the arithmetic mean curvature Spc of peak apexes defined by ISO25178 among surface roughnesses in the surface evaluation regarding the surface of the chip discharge groove 6. Here, the arithmetic mean curvature Spc of the peak apexes is an index of degree at which the apexes of peaks are sharp. If the value of the arithmetic mean curvature Spc of the peak apexes is small, state where the apexes of peaks coming into contact with another object are rounded is shown. If the value of the arithmetic mean curvature Spc of the peak apexes is large, a state where the apexes of peaks coming into contact with another object are sharp is shown. If the value of the arithmetic mean curvature Spc of the surface of the chip discharge groove 6 becomes large, a state where sharp peak apexes increase on the surface of the chip discharge groove 6 is shown, and even if the arithmetic mean roughness Ra or the maximum height roughness Rz, which is general surface roughness, is made smooth, chips tend to be blocked in the chip discharge groove 6.

Thus, in the present embodiment, the sharp peak apexes on the surface of the chip discharge groove 6 can be reduced by forming the surface of the chip discharge groove 6 such that the arithmetic mean curvature Spc (1/mm) of the peak apexes defined by ISO25178 is 800 or less. As a result, chip clogging can be suppressed to suppress wear or sudden loss of the rake faces. It is more desirable that the arithmetic mean curvature Spc (1/mm) of the peak apexes, defined by ISO25178, on the surface of this chip discharge groove 6 is 700 or less, and it is still more preferable that the arithmetic mean curvature Spc (1/mm) of the peak apexes on this surface is 650 or less.

In addition, in order to make the surface of the chip discharge groove 6 smooth in this way, it is desirable to coat a surface of a smooth base material, in which cutting marks are reduced by smoothing machining, with a smooth hard film by a sputtering method capable of coating a smooth hard film with less generation of droplets, and then jetting abrasive powder against the surface of the hard film through blasting or the like to perform smoothing machining. Additionally, such a hard film is desirably a metal nitride or metallic carbonitride, and is particularly desirably a metal nitride that is excellent in heat resistance and wear resistance.

The surface roughness of the chip discharge groove 6 to be evaluated in the invention may be obtained by measuring a portion coated with the hard film.

Example 1

Next, effects of the invention will be demonstrated taking examples of the invention. First, in Example 1, the shape of the drill bit body 1 was evaluated.

In Example 1, a small-diameter drill bit, made of cemented carbide based on the above embodiment, in which the diameter D of the cutting blades 7 was 1 mm, the groove length was 23 mm, the margin length L was 10 mm, and the shape of the cutting blade part 3 as seen from the tip side in the direction of the axis O was as shown in FIG. 2 was evaluated as Present Invention Example 1.

In addition, in Present Invention Example 1, the difference between the lengths W of the two main cutting blades 7a as seen from the tip side in the direction of the axis O was 0.01 mm that was 0.04 mm or less. Additionally, the first extension line N1 extending from one linear, first intersecting ridgeline M1 between the first tip flank face 5a and the second tip flank face 5b to the other first intersecting ridgeline M1 was located on the side in the drill bit rotation direction T with respect to the other first intersecting ridgeline M1 and the distance d1 was 0.06 mm that was 0.04 mm to 0.08 mm. Additionally, the second extension line N2 extending from one linear, second intersecting ridgeline M2 between the second tip flank face 5b and the thinning face 8a to the other second intersecting ridgeline M2 was located on the side in the drill bit rotation direction T with respect to the other second intersecting ridgeline M2 and the distance d2 was 0.06 mm that was 0.08 mm or less.

Additionally, as Comparative Example 1 with respect to Example 1, a small-diameter drill bit having the same shape and size as those of Present Invention Example 1 except that the difference between the lengths W of the two main cutting blades 7a as seen from the tip side in the direction of the axis O was 0.05 mm that was larger than 0.04 mm was evaluated.

Moreover, as Comparative Example 2, a small-diameter drill bit having the same shape and size as those of Present Invention Example 1 except that a margin part was a single margin in which only the first margin part 10a was adjacent to the side of a chip discharge groove 6 opposite to the drill bit rotation direction T and the second margin part 10b was not formed was evaluated.

Moreover, as Comparative Example 3, a small-diameter drill bit having the same shape and size as those of Present Invention Example 1 except that the first extension line N1 extending from one linear, first intersecting ridgeline M1 between the first tip flank face 5a and the second tip flank face 5b to the other first intersecting ridgeline M1 was located on the side in the drill bit rotation direction T with respect to the other first intersecting ridgeline M1 and the distance d1 was 0.03 mm was evaluated.

Moreover, as Comparative Example 4, a small-diameter drill bit having the same shape and size as those of Present Invention Example 1 except that the second extension line N2 extending from one linear, second intersecting ridgeline M2 between the second tip flank face 5b and the thinning face 8a to the other second intersecting ridgeline M2 was located on the side in the drill bit rotation direction T with respect to the other second intersecting ridgeline M2 and the distance d2 was 0.10 mm was evaluated.

In addition, in the small-diameter drill bits of Present Invention Example 1 and Comparative Examples 1 to 4, the surface of the cutting blade part 3 also including the surfaces of the chip discharge grooves 6 was coated with a nitride film of Ti and Si with an average film thickness of about 1 μm.

Then, drilling was performed on workpieces made of SUS304 of 150 mm×190 mm×40 mm by the small-diameter drill bits of Present Invention Examples 1 and Comparative Examples 1 to 4 on non-step machining conditions of Vc=30 m/min, rotating speed=9549 $min^{-1}$, feed amount=0.02 mm/rev, feed speed=190 mm/min, and machined hole depth=18 mm.

As a result, in Present Invention Example 1, even if machining of 3000 or more holes was performed, breakage or the like was not caused, and further machining was possible.

In contrast, in Comparative Example 1, since machining loads to two main cutting blades were uneven, hole bending occurred, and breakage was caused early in machining of less than ten holes.

Additionally, in Comparative Example 2, due to the single margin, as wear proceeded, machining loads to two main cutting blades became uneven and hole bending was caused, and when 1671 holes fewer than Present Invention Example 1 were machined, breakage was caused and the service life ended.

Additionally, in Comparative Example 3, when wear of the flank faces proceeded, the contact area of the flank faces became larger compared with the other small-diameter drill bits, and when 1323 holes fewer than Present Invention Example 1 were machined, breakage was caused and the service life was ended.

Additionally, in Comparative Example 4, the contact area at the time of drill bit biting became small, and machining became unstable. As a result, when 200 holes were machined, breakage was caused and the service life ended.

Example 2

Next, as Example 2, the influence in a case where the surfaces of the chip discharge grooves 6 were coated with the hard film and smoothed was evaluated. In Example 2, two types of same-shape and same-size small-diameter drill bits, made of cemented carbide based on the above embodiment, in which the diameter D of the cutting blades 7 was 1 mm, the groove length was 33 mm, the margin length L was 12 mm, and the shape of the cutting blade part 3 as seen from the tip side in the direction of the axis O was as shown in FIG. 2 were evaluated as Present Invention Examples 10 and 11.

In Present Invention Example 10 out of these examples, an entire surface of the cutting blade part 3 including the surfaces of the chip discharge grooves 6 was coated with the nitride film of Ti and Si with an average film thickness of about 1 μm by the sputtering method, and then, the surfaces of the chip discharge grooves 6 were irradiated with abrasive power and subjected to smoothing machining.

Additionally, in Present Invention Example 11, an entire surface of the cutting blade part 3 including the surfaces of the chip discharge grooves 6 was similarly coated with the nitride film of Ti and Si with an average film thickness of about 1 μm by an arc ion plating method, and then, the surface of the chip discharge groove 6 was irradiated with abrasive power and subjected to smoothing machining on the same conditions as those of Present Invention Example 10.

Then, first, an arithmetic mean height Sa (μm) of surfaces defined by ISO25178 and an arithmetic mean curvature Spc (1/mm) of peak apexes were measured regarding the chip discharge grooves 6 in which the hard film was formed in the small-diameter drill bit of Present Invention Examples 10 and 11. In addition, observation was made at a magnification of 50 times with a cutter value of 0.25 mm using a shape analysis laser microscope made by KEYENCE CORP. (VK-X250) for the measurement, three regions of 60 μm×100 μm were measured, and a measurement value was calculated from a measurement average in the regions.

Next, drilling was performed on workpieces made of the same SUS304 of 150 mm×190 mm×40 mm as Example 1 by the small-diameter drill bits of Present Invention Examples 10 and 11 on non-step machining conditions of Vc=50 m/min, rotating speed=16000 $min^{-1}$, feed amount=0.02 mm/rev, feed speed=320 mm/min, and machined hole depth=28 mm, and the number of holes that were capable of being machined was measured. Measurement results of the arithmetic mean height Sa (μm) of the surfaces and the arithmetic mean curvature Spc (1/mm) of the peak apexes and cutting evaluation (the number of holes) are shown in combination in Table 1.

TABLE 1

|  | Arithmetic Mean Height of Surface Sa (μm) | Arithmetic Mean Curvature Spc (1/mm) | Cutting Evaluation (Holes) |
|---|---|---|---|
| Present Invention Example 10 | 0.057 | 610 | 4542 |
| Present Invention Example 11 | 0.054 | 950 | 3559 |

From the results of Table 1, regarding Present Invention Examples 10 and 11, the surfaces of the hard films are smoothed. Thus, both of Present Invention Examples have substantially equal measurement values in terms of the arithmetic mean height Sa (μm) of the surfaces and are smooth, and excellent service life with 3000 or more holes capable of being machined is obtained. Particularly, regarding Present Invention Example 10 in which the hard film was coated by the sputtering method, the arithmetic mean curvature Spc of the peak apexes is 610 (1/mm) and 800 or less, and sharp peak apexes are less likely to be formed on the surfaces of the chip discharge grooves 6. Therefore, it can be seen that that chip clogging does not occur easily and the service life of the drill bits are markedly improved.

INDUSTRIAL APPLICABILITY

As described earlier, according to the invention, even in the elongated small-diameter drill bit, not only the cutting blade part can be supported with the double margin, but also the difference between the cutting resistances acting on the two main cutting blades can be made small, the rigidity of the cutting blades can be sufficiently secured to suppress the shaking of the cutting blade part, and hole drilling with little breakage can be performed with high accuracy.

REFERENCE SIGNS LIST

1: drill bit body
2: shank part
3: cutting blade part
4: tapered neck part
5: tip flank face
5a: first tip flank face
5b: second tip flank face
6: chip discharge groove
7: cutting blade
7a: main cutting blade
7b: thinning blade
7c: chisel
8: thinning part
8a: thinning face
9: land part
10a: first margin part
10b: second margin part
10c: outer peripheral relief face
11: heel
12: coolant hole
O: axis of drill bit body 1
T: drill bit rotation direction D: diameter of cutting blade 7
L: margin length
W: length of main cutting blade 7a as seen from tip side in direction of axis O
M1: first intersecting ridgeline
M2: second intersecting ridgeline
N1: first extension line
N2: second extension line
D1: distance between first extension line n1 and the first intersecting ridgeline M1 as seen from tip side in direction of axis O
D2: distance between second extension line N2 and second intersecting ridgeline m2 as seen from tip side in direction of axis O

What is claimed is:

1. A small-diameter drill bit in which two chip discharge grooves opening to two tip flank faces of a drill bit body and extending to a rear end side are formed symmetrically with respect to an axis at an outer periphery of a tip part of the drill bit body that is configured to rotate around the axis, cutting blades are respectively formed at intersecting ridgeline parts between wall faces of the chip discharge grooves that face a drill bit rotation direction and the tip flank faces, a first margin part adjacent to a side of each of the chip discharge grooves opposite to the drill bit rotation direction, and a second margin part adjacent to a side of the chip discharge groove in the drill bit rotation direction are formed on a land part between the chip discharge grooves, and a diameter D of the cutting blades is between 2 mm and 1 mm, wherein a ratio L/D of each respective margin length L to the diameter D is 3 or more, the margin length L being in a direction of the axis from an outer peripheral end of each of the cutting blades to a rear end of each of the first and second margin parts, wherein a thinning part is formed at an inner periphery of a tip part of the chip discharge groove, wherein the thinning part has a thinning face that faces the side opposite to the drill bit rotation direction, wherein each of the cutting blades includes a main cutting blade that linearly extends from an outer periphery of the drill bit body toward an inner periphery side thereof as seen from a tip side in the axis direction, and a thinning blade that is bent on the inner peripheral side of the main cutting blade and is formed at an intersecting ridgeline part between the thinning part and each of the tip flank face, wherein a difference between lengths from outer peripheral ends of two main cutting blades as seen from the axis direction tip side is 0.04 mm or less, wherein the tip flank faces each has a first tip flank face and a second tip flank face, wherein the first tip flank face is connected to a side of the cutting blade opposite to the drill bit rotation direction, wherein the second tip flank face is connected to a farther side of the first tip flank face opposite to the drill bit rotation direction, intersects the thinning face, wherein a first intersecting ridgeline between the first tip flank face and the second tip flank face and a second intersecting ridgeline between the second tip flank face and the thinning face are linear as seen from the axis direction tip side, wherein as seen from the axis direction tip side, the two tip flank faces are formed such that a first extension line extending from the first intersecting ridgeline in one of the tip flank faces to the opposite tip flank face side is located on a side in the drill bit rotation direction side with respect to the first intersecting ridgeline of the opposite tip flank face, wherein a distance between the first extension line and the first intersecting ridgeline as seen from the axis direction tip side is in a range of 0.04 mm to 0.08 mm, wherein as seen from the axis direction tip side, the two tip flank faces are formed such that a second extension line extending from the second intersecting ridgeline in one tip flank face to the opposite tip flank face side is located on the side in the drill bit rotation direction with respect to the second intersecting ridgeline of the opposite tip flank face wherein a distance between the second extension line and the second intersecting ridgeline is in a range of 0.08 mm or less as seen from the axis direction tip side, and wherein succession in the drill bit rotation direction is as follows: the main cutting blade, the second intersecting ridgeline, the second extension line, the first intersecting ridgeline, and the first extension line.

2. The small-diameter drill bit according to claim 1,
wherein the second margin part is formed in a direction as extending from the second tip flank face to the thinning face in a circumferential direction.

3. The small-diameter drill bit according to claim 1,
wherein the wall faces of the chip discharge grooves are coated with a nitride film of Ti and Si.

4. The small-diameter drill bit according to claim 3,
wherein the wall faces of the chip discharge grooves are coated with the nitride film of Ti and Si by a sputtering method, and then, the wall faces of the chip discharge grooves are irradiated with abrasive power and subjected to smoothing machining.

5. The small-diameter drill bit according to claim 3,
wherein the wall faces of the chip discharge grooves are coated with the nitride film of Ti and Si by an arc ion plating method, and then, the surface of the chip discharge grooves are irradiated with abrasive power and subjected to smoothing machining.

* * * * *